(12) United States Patent
Claus et al.

(10) Patent No.: US 7,979,339 B2
(45) Date of Patent: Jul. 12, 2011

(54) SYSTEM AND METHOD FOR OPTIMIZING EXECUTION OF TRADING ORDERS

(75) Inventors: Matthew W. Claus, Summit, NJ (US);
James R. Driscoll, New York, NY (US);
James C. Johnson, Cresskill, NJ (US)

(73) Assignee: BGC Partners, Inc., New York, NY (US)

( * ) Notice: Subject to any disclaimer, the term of this patent is extended or adjusted under 35 U.S.C. 154(b) by 737 days.

(21) Appl. No.: 11/398,241

(22) Filed: Apr. 4, 2006

(65) Prior Publication Data
US 2007/0233593 A1 Oct. 4, 2007

(51) Int. Cl.
*G06Q 40/00* (2006.01)

(52) U.S. Cl. ............ 705/37; 705/35; 705/36; 705/39; 705/44

(58) Field of Classification Search ........... 705/35–45
See application file for complete search history.

(56) References Cited

U.S. PATENT DOCUMENTS

| | | | |
|---|---|---|---|
| 4,674,044 A | 6/1987 | Kalmus et al. ............... 364/408 |
| 6,029,146 A | 2/2000 | Hawkins et al. ............... 705/35 |
| 6,098,051 A | 8/2000 | Lupien et al. ............... 705/37 |
| 6,536,935 B2 | 3/2003 | Parunak et al. ............ 364/148.01 |
| 6,615,188 B1 | 9/2003 | Breen et al. |
| 6,731,729 B2 | 5/2004 | Eng et al. ............... 379/121.03 |
| 6,847,934 B1 | 1/2005 | Lin et al. ............... 705/10 |
| 6,871,191 B1 | 3/2005 | Kinney, Jr. et al. ............ 705/37 |
| 6,938,011 B1 | 8/2005 | Kemp, II et al. ............ 705/37 |
| 6,983,260 B2 | 1/2006 | Hummelgren ............... 705/37 |
| 7,110,975 B2 * | 9/2006 | Marks de Chabris et al. .. 705/37 |
| 7,113,924 B2 | 9/2006 | Fishbain ............... 705/37 |
| 7,127,424 B2 | 10/2006 | Kemp, II et al. ............ 705/37 |
| 7,246,092 B1 | 7/2007 | Peterson et al. |
| 7,330,834 B1 * | 2/2008 | LaPierre ............... 705/37 |
| 2002/0052827 A1 | 5/2002 | Waelbroeck et al. ............ 705/37 |
| 2002/0091606 A1 | 7/2002 | Shapiro ............... 705/36 |
| 2002/0120546 A1 | 8/2002 | Zajac ............... 705/37 |
| 2002/0178104 A1 * | 11/2002 | Hausman ............... 705/37 |
| 2003/0101130 A1 | 5/2003 | Cliff ............... 705/37 |
| 2003/0149661 A1 | 8/2003 | Mitchell et al. ............ 705/39 |
| 2003/0229569 A1 * | 12/2003 | Nalbandian et al. ............ 705/37 |
| 2003/0236729 A1 | 12/2003 | Epstein et al. ............ 705/36 |
| 2004/0034591 A1 | 2/2004 | Waelbroeck et al. ............ 705/37 |

(Continued)

FOREIGN PATENT DOCUMENTS

GB 2 382 679 A 6/2003

(Continued)

OTHER PUBLICATIONS

"Prioritization of Trade Order Processing in Electronic Trading", dated Jun. 26, 2009.*

(Continued)

*Primary Examiner* — Ella Colbert
*Assistant Examiner* — Hai Tran

(57) ABSTRACT

A system for processing trading orders comprises an optimizer module operable to receive a first trading order and a second trading order. The optimizer module is further operable to receive market data associated with at least one market center. The optimizer module is further operable to determine whether to transmit the second trading order to the at least one market center prior to transmitting the first trading order to the at least one market center, the determination based at least in part on the market data.

45 Claims, 4 Drawing Sheets

U.S. PATENT DOCUMENTS

| | | | |
|---|---|---|---|
| 2004/0093296 A1 | 5/2004 | Phelan et al. | 705/36 |
| 2004/0143538 A1* | 7/2004 | Korhammer et al. | 705/37 |
| 2004/0215538 A1 | 10/2004 | Smith et al. | 705/35 |
| 2005/0015323 A1* | 1/2005 | Myr | 705/37 |
| 2005/0027635 A1* | 2/2005 | Monroe et al. | 705/37 |
| 2005/0125326 A1* | 6/2005 | Nangalia et al. | 705/37 |
| 2005/0154630 A1 | 7/2005 | Lin et al. | 705/10 |
| 2006/0015436 A1 | 1/2006 | Burns et al. | |
| 2006/0085319 A1 | 4/2006 | Nangalia et al. | 705/37 |
| 2006/0253379 A1 | 11/2006 | Adcock et al. | 705/37 |
| 2006/0253381 A1 | 11/2006 | Adcock et al. | 705/37 |
| 2006/0259404 A1 | 11/2006 | Brumfield et al. | 705/37 |
| 2006/0277137 A1 | 12/2006 | Claus et al. | 705/37 |
| 2007/0005481 A1 | 1/2007 | Kedia et al. | 705/37 |
| 2007/0174179 A1 | 7/2007 | Avery | 705/37 |
| 2007/0219898 A1 | 9/2007 | Burkhardt et al. | 705/37 |
| 2008/0097893 A1 | 4/2008 | Walsky et al. | |

FOREIGN PATENT DOCUMENTS

| | | |
|---|---|---|
| WO | WO 01/61549 A2 | 8/2001 |
| WO | WO 01/86546 A1 | 11/2001 |
| WO | WO 02/17194 A1 | 2/2002 |
| WO | WO 02/23451 A1 | 3/2002 |
| WO | WO 03/093930 A2 | 11/2003 |
| WO | WO 2005/020028 A2 | 3/2005 |

OTHER PUBLICATIONS

Lee, et al., "R-Trader: An Automatic Stock Trading System based on Reinforcement Learning," The British Library, pp. 785-794, (Abstract translated).

Tan, "Using genetic algorithm to optimize an oscillator-based market timing system," The British Library, pp. B115-B122.

Ye, et al., "Application of Genetic Algorithm to Optimal Portfolio with Risk Control," The British Library, pp. 351-354.

Steiner, et al., "Portfolio optimization with a neural network implementation of the coherent market hypothesis," The British Library, Elsevier Science B.V., pp, 27-40, rev. Nov. 11, 1995.

Lin, et al., "The Applications of Genetic Algorithms in Stock Market Data Mining Optimisation," Faculty of Information Technology, University of Technology, 9 pages, 2000.

Fukutome, et al., "Bidding market based on single price model with network constraints," IEEE, pp. 1245-1250 plus 4 pages, 2004.

Wachi, et al., "Application for Single Price Auction Model (SPA) in AC Network," pp. 81-89 plus 1 drawing page, (first paragraph translated), 2005.

Wallman; *Technology Takes to Securities Trading*; IEEE Spectrum; pp. 60-65, Feb. 1997.

Schmerken; *CyBerCorp to Introduce Trading Via CBOE*; Wall Street & Technology; cover sheet plus p. 50, Jan. 2000.

Zéroual; *An Open Distributed Request Propagation Approach for Trading Services*; Proceedings of the Second International Conference on Machine Learning and Cybernetics, Xi'An; pp. 3253-3258, Nov. 2003.

*Notification of Transmittal of the International Search Report and the Written Opinion of the International Searching Authority, or the Declaration* for International Application No. PCT/US06/22441; 8 pages, May 1, 2007.

*Notification of Transmittal of the International Search Report and the Written Opinion of the International Searching Authority* for International Application No. PCT/US07/07602; 8 pages, Sep. 24, 2007.

U.S. PTO Pending U.S. Appl. No. 11/146,646, filed Jun. 7, 2005; 29 pages.

U.S. PTO Office Action for U.S. Appl. No. 11/146,646; 12 pages; Jan. 25, 2009.

U.S. PTO Office Action for U.S. Appl. No. 11/146,646; 13 pages; Jan. 19, 2010.

Notice of Allowance for U.S. Appl. No. 11/146,646; 7 pages; Sep. 16, 2010.

Hasbrouck et al.: Limit orders and volatility in a Hybrid Market: The Island ECN, Department of Finance, Stern School, NYU, Sep. 26, 2001, pp. 1-54.

Market Access Subcommittee: Best Practices for organized electronic markets, Commodity Futures Trading Commission, Nov. 21, 2001, pp. 1-22.

Bongiovannu et al.: Lets play hide and seek: The location and size of undisclosed limit order volume, The Hournal of trading, Summer 2006, pp. 34-46.

U.S. PTO Office Action for U.S. Appl. No. 12/953,407; 16 pages; Mar. 14, 2011.

* cited by examiner

| Trading Product | Quantity | Unit Price | Quality Score 150 | Quality Threshold 160 |
|---|---|---|---|---|
| Trading Order 12a | Product X | 11 million units | $11.00 | 5 | 6 |
| Trading Order 12b | Product X | 125 million units | $12.00 | 9 | 6 |

SYSTEM AND METHOD FOR OPTIMIZING EXECUTION OF TRADING ORDERS

TECHNICAL FIELD OF THE INVENTION

The present invention relates generally to electronic trading and more specifically to a system and method for optimizing execution of trading orders.

BACKGROUND OF THE INVENTION

In recent years, electronic trading systems have gained widespread acceptance for the trading of a variety of items, such as goods, services, financial instruments, and commodities. Electronic trading systems generally receive and process trading orders from traders. Occasionally, traders submit low quality or unrealistic trading orders. Such trading orders specify criteria that vary widely from prevailing market conditions. For example, if the prevailing market price for a particular trading product is $25.00 per unit, a trading order to buy the particular trading product for $8.00 per unit may be considered an unrealistic trading order. Unrealistic trading orders do not typically result in quickly executed transactions. Instead, unrealistic trading orders usually remain unfilled for long periods of time. As a result, unrealistic trading orders do not increase liquidity in the market place.

Electronic trading systems typically process trading orders received from traders according to "first-in, first-out" (FIFO) principles. Based on FIFO principles, electronic trading systems process trading orders in the order in which they are received from traders. As a result, if a realistic trading order (i.e., a trading order that is likely to result in a quickly executed transaction) is received shortly after an unrealistic trading order (i.e., a trading order that is unlikely to be filled quickly), the realistic trading order must wait while the electronic trading system first processes the unrealistic trading order. This delay in processing the realistic trading order may decrease liquidity in the market place.

SUMMARY OF THE INVENTION

In accordance with the present invention, the disadvantages and problems associated with prior electronic trading systems have been substantially reduced or eliminated.

A system for processing trading orders comprises an optimizer module operable to receive a first trading order and a second trading order. The optimizer module is further operable to receive market data associated with at least one market center. The optimizer module is further operable to determine whether to transmit the second trading order to the at least one market center prior to transmitting the first trading order to the at least one market center, the determination based at least in part on the market data.

Various embodiments of the present invention may benefit from numerous advantages. It should be noted that one or more embodiments may benefit from some, none, or all of the advantages discussed below. One advantage of the present invention is that the trading system analyzes the quality of trading orders received from traders based on current market data. Another advantage is that the trading system analyzes the quality of trading orders based on the trading system's available processing and storage capacity. The trading system assigns priority to trading orders that are most likely to result in quickly executed transactions. In some embodiments, the trading system filters out trading orders that are unlikely to result in timely executed transactions. By assigning priority to realistic trading orders (i.e., trading orders that are likely to result in quickly executed transactions), the trading system reduces the processing time for realistic trading orders. The trading system may thereby increase liquidity in the market place.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Figure 1:
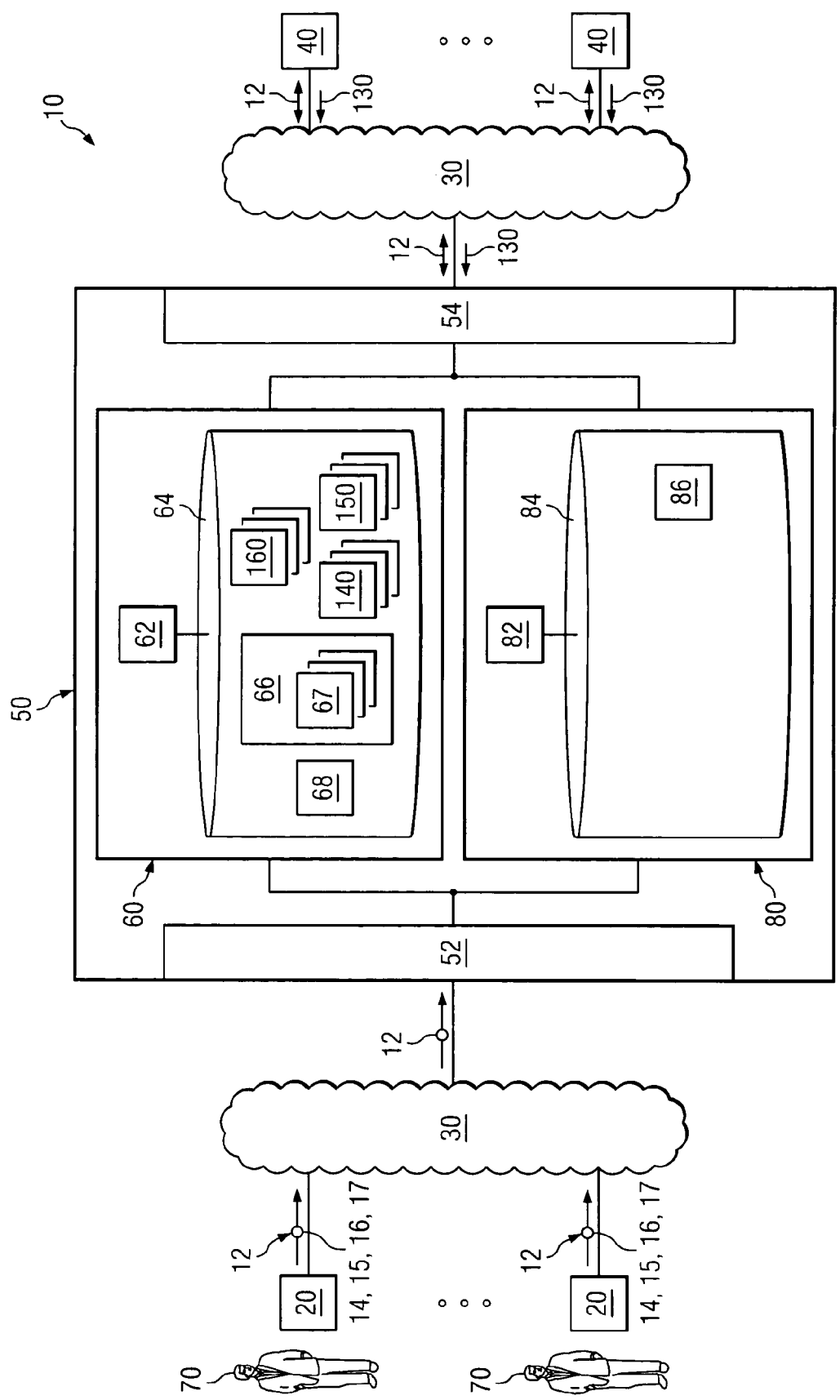
FIG. 1 illustrates a trading system according to one embodiment of the present invention.

FIG. 1 illustrates one embodiment of a trading system 10. Generally, trading system 10 comprises a trading platform 50 communicatively connected to clients 20, networks 30, and market centers 40. In order to facilitate trading, trading system 10 matches trading orders 12 placed by traders 70. Generally, trading platform 50 may determine priority among trading orders 12 based at least in part on current market conditions. By assessing current market conditions, trading platform 50 may assign priority to trading orders 12 that are most likely to result in timely executed transactions. According to certain embodiments, trading platform 50 may thereby increase the liquidity of trading products.

Clients 20 comprise any suitable local or remote end-user devices that may be used by traders 70 to access one or more elements of trading system 10, such as trading platform 50. A particular client 20 may comprise a computer, workstation, telephone, Internet browser, electronic notebook, Personal Digital Assistant (PDA), pager, or any other suitable device (wireless or otherwise), component, or element capable of receiving, processing, storing, and/or communicating information with other components of system 10. Client 20 may also comprise any suitable user interface such as a display, microphone, keyboard, or any other appropriate terminal equipment according to particular configurations and arrangements. It will be understood that there may be any number of clients 20 communicatively connected to trading platform 50. In addition, there may be any number of clients 20 communicatively connected to market centers 40 without using trading platform 50.

Clients 20 are operable to receive trading orders 12 from traders 70 and to send trading orders 12 to trading platform 50 and/or market centers 40. Trading orders 12 comprise orders and counterorders. Orders and counterorders may be "takes" 14, "bids" 15, "hits" 16, and "offers" 17. Orders and counterorders are complementary actions such as, for example, buying and selling. A bid 15 is a request to buy a particular quantity of a particular trading product at a particular price (bid price). Conversely, an offer 17 is a request to sell a particular quantity of a particular trading product at a particular price (offer price). A take 14 is a request to buy a particular quantity of a particular trading product 12 at the best offer price. Conversely, a hit 16 is a request to sell a particular quantity of a particular trading product at the best bid price. Bids 15 and offers 17 may be considered passive trading orders 12 because a bid 15 and an offer 17 generally remain in the trading books until aggressed by a corresponding take 14 or hit 16. Takes 14 and hits 16 are therefore considered aggressive trading orders 12. Although system 10 is exemplified below using equities as the trading product, the trading product that forms the basis of trading order 12 may comprise any goods, services, financial instruments, commodities, etc. Examples of financial instruments include, but are not limited to, stocks, bonds, and futures contracts.

Although clients 20 are described herein as being used by "traders" 70, it should be understood that the term "trader" is meant to broadly apply to any user of trading system 10, whether that user is an individual, a machine, an agent acting on behalf of a principal, a principal, a legal entity (such as a corporation), or any mechanism that is capable of placing and/or responding to trading orders 12 in system 10.

Networks 30 are communication platforms operable to exchange data and/or information between clients 20 and trading platform 50 and/or market centers 40. Network 30 may represent any wireless and/or wireline network which provides clients 20 with the ability to communicate trading or transaction information to trading platform 50 and/or market centers 40. Network 30 may comprise an Internet architecture. Alternatively, or in addition, network 30 may comprise a plain old telephone system (POTS). Transactions may be assisted by a broker associated with trading platform 50 or manually keyed into a telephone or other suitable electronic device to request that a transaction be executed. In certain embodiments, network 30 may be any packet data network (PDN) offering a communications interface or exchange between any two nodes in system 10. Network 30 may further comprise any combination of local area network (LAN), metropolitan area network (MAN), wide area network (WAN), wireless local area network (WLAN), virtual private network (VPN), intranet, cellular network, private network, or any other suitable number and combination of wireless and/or wireline architectures or systems that facilitates communication between clients 20 and other components of system 10.

Market centers 40 comprise all manner of order execution venues including exchanges, Electronic Communication Networks (ECNs), Alternative Trading Systems (ATSs), market makers, or any other suitable market participants. Each market center 40 maintains a bid price and an offer price for a given trading product by standing ready, willing, and able to buy or sell that trading product at publicly quoted prices, also referred to as market center prices. Different market centers 40 may provide different market center prices for particular trading products. For example, a particular market center 40 may offer a particular bid price and/or offer price for a particular trading product, while another market center 40 may offer a different bid price and/or offer price for the same trading product. A particular market center 40 may charge a transaction cost to execute trading orders 12 that remain in the order books of that market center 40 for more than a certain length of time.

Different market centers 40 may have different policies regarding the disclosure of various details of trading orders 12. Generally, trading order 12 may comprise two parts—a "displayed quantity" and a "reserved quantity." In placing trading order 12, trader 70 may indicate that only a portion of the total quantity of trading order 12 should be displayed by trading platform 50 or market center 40 to other traders 70. This portion of trading order 12 to be displayed to other traders 70 is referred to as the "displayed quantity." The remaining portion of trading order 12 is referred to as the "reserved quantity." Designating a portion of trading order 12 as a "reserved quantity" allows trader 70 to enter a large trading order 12 while having trading platform 50 or market center 40 only display a portion of that trading order 12 to other traders 70.

Trading platform 50 is a trading architecture that facilitates the routing, matching, and other processing of trading orders 12. Trading platform 50 may comprise a management center or a headquartering office for any person, business, or entity that seeks to route, match, process, or fill trading orders 12. Accordingly, trading platform 50 may include any suitable combination of hardware, software, personnel, devices, components, elements, or objects that may be utilized or implemented to achieve the operations and functions of an administrative body or a supervising entity that manages or administers a trading environment. In certain embodiments, trading platform 50 comprises client interface 52, market interface 54, optimizer module 60, and matching module 80.

Client interface 52 of trading platform 50 is communicatively connected to network 30 and supports communications between clients 20 and the various components of trading platform 50. According to certain embodiments, client interface 52 comprises a transaction server that receives trading orders 12 communicated by clients 20 via network 30.

Market interface 54 is communicatively connected to market centers 40 and supports communications between market centers 40 and the various components of trading platform 50. Market interface 54 may comprise a transaction server that receives trading orders 12 communicated by market centers 40. In addition, market interface 54 may send to market centers 40 trading orders 12 received from clients 20 connected directly to trading platform 50. Market interface 54 may also receive market data 130 from market centers 40. Market data 130 may comprise information regarding market conditions such as, for example, trading volumes, best bid/offer prices, trends in prices, trends in trading volumes, time of entry of trading orders 12, number of outstanding trading orders 12, number of active traders 70, or any other information suitable to optimize the processing of trading orders 12 by trading platform 50.

Client interface 52 and market interface 54 may be communicatively connected to optimizer module 60 and/or matching module 80. Optimizer module 60 represents any hardware, software, firmware, or combination thereof operable to process, control, and monitor the prioritizing, sequencing, and/or filtering of trading orders 12 submitted by traders 70. Optimizer module 60 may comprise a general-purpose personal computer (PC), a workstation, a Unix-based computer, a server computer, or any other suitable processing device. Generally, optimizer module 60 receives trading orders 12 from traders 70 and prioritizes, sequences, and/or filters trading orders 12 based at least in part on market data 130, platform data 140, and/or the characteristics of trading orders 12. In particular, optimizer module 60 is capable of prioritizing and filtering trading orders 12 to optimize liquidity in market centers 40 and trading platform 50 and to optimize the efficiency of trading platform 50 and/or other trading resources. Optimizer module 60 may comprise optimizer processor 62 and optimizer memory 64. Although FIG. 1 illustrates a single optimizer module 60 in system 10, system 10 can be implemented using any suitable number and combinations of optimizer modules 60.

Optimizer processor 62 is operable to record trading orders 12 in optimizer memory 64 and to transmit trading orders 12 to matching module 80 and/or market centers 40. Optimizer processor 62 is further operable to execute rules 67 in optimizer logic 66 to prioritize, sequence, and or filter trading orders 12 based at least in part on market data 130, platform data 140, and/or the characteristics of trading orders 12. Optimizer processor 62 may comprise any suitable combination of hardware and/or software implemented in one or more modules to provide the described function or operation.

Optimizer memory 64 comprises any suitable arrangement of random access memory (RAM), read only memory (ROM), magnetic computer disk, CD-ROM, or other magnetic or optical storage media, or any other volatile or nonvolatile memory devices that store one or more files, lists, tables, or other arrangements of information such as trading orders 12. Although FIG. 1 illustrates optimizer memory 64 as internal to optimizer module 60, it should be understood that optimizer memory 64 may be internal or external to components of trading system 10, depending on particular implementations. Also, optimizer memory 64 illustrated in FIG. 1 may be separate from or integral to other memory devices to achieve any suitable arrangement of memory devices for use in trading system 10.

According to certain embodiments, optimizer memory 64 comprises optimizer logic 66. Generally, optimizer logic 66 comprises rules 67 for prioritizing, sequencing, and/or filtering trading orders 12 based at least in part on market data 130, platform data 140, and/or the characteristics of trading orders 12. Rules 67 may comprise algorithms, formulas, functions, tables, or any suitable instructions for prioritizing, sequencing, and/or filtering trading orders 12 to optimize the execution of trading orders 12. By prioritizing, sequencing, and/or filtering trading orders 12, trading platform 50 may promote and increase liquidity in the marketplace and optimize the efficient use of system resources.

Matching module 80 may be communicatively coupled to client interface 52, market interface 54, and optimizer module 60. Matching module 80 represents any hardware, software, firmware, or combination thereof operable to process, control, monitor, route, and/or match trading orders 12 submitted by traders 70. Matching module 80 may comprise a general-purpose personal computer (PC), a workstation, a Unix-based computer, a server computer, or any other suitable processing device. Matching module 80 may comprise matching processor 82 and matching memory 84. Although FIG. 1 illustrates a single matching module 80 in system 10, system 10 can be implemented using any suitable number and combination of matching modules 80.

Matching processor 82 is operable to record trading orders 12 in matching memory 84 and route trading orders 12 to market centers 40. Matching processor 82 is further operable to execute matching logic 86 stored in matching memory 84 to match trading orders 12 received by client interface 52 and market interface 54. Matching processor 82 may comprise any suitable combination of hardware and/or software implemented in one or more modules to provide the described function or operation.

Matching memory 84 comprises any suitable arrangement of random access memory (RAM), read only memory (ROM), magnetic computer disk, CD-ROM, or other magnetic or optical storage media, or any other volatile or nonvolatile memory devices that store one or more files, lists, tables, or other arrangements of information such as trading orders 12. Although FIG. 1 illustrates matching memory 84 as internal to trading platform 50, it should be understood that matching memory 84 may be internal or external to components of trading system 10, depending on particular implementations. Also, matching memory 84 illustrated in FIG. 1 may be separate from or integral to other memory devices to achieve any suitable arrangement of memory devices for use in trading system 10.

It should be understood that the internal structure of trading platform 50 and the interfaces, modules, processors, and memory devices associated therewith is malleable and can be readily changed, modified, rearranged, or reconfigured to achieve the intended operations of trading platform 50.

Figures 2, 3:
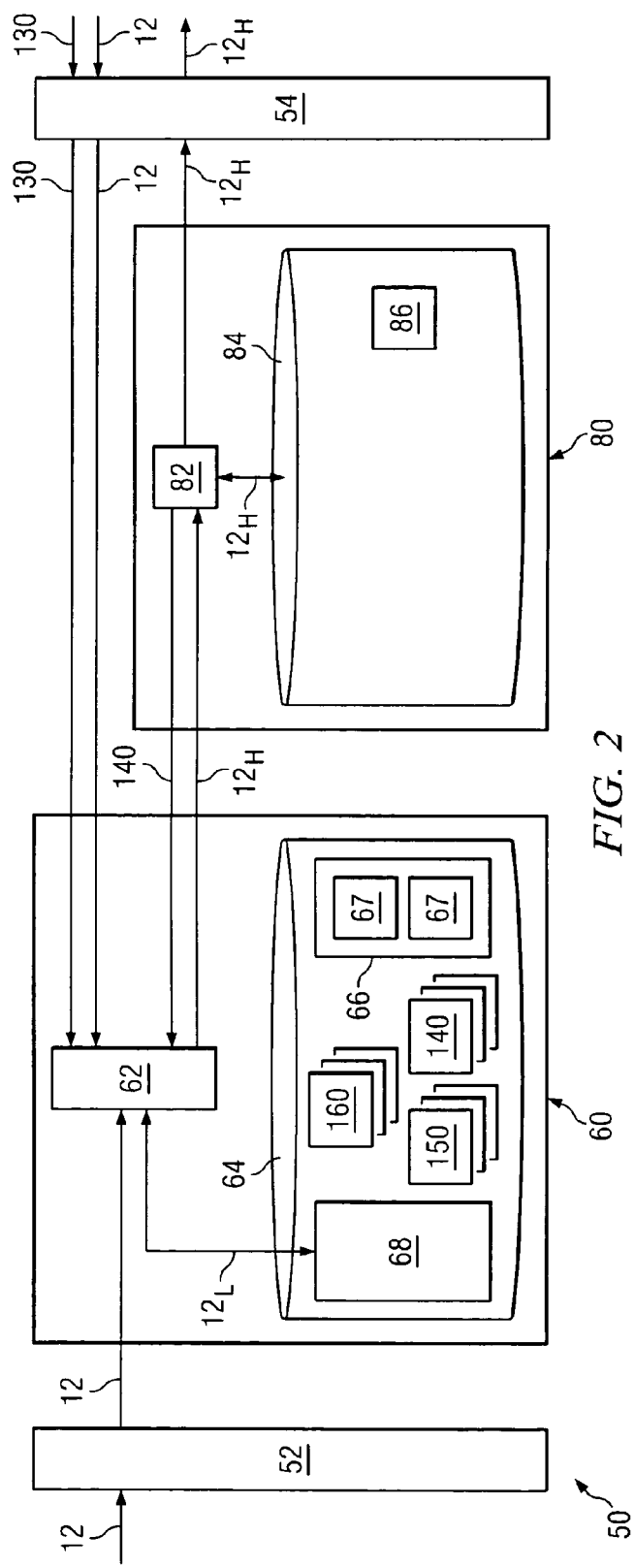
FIG. 2 illustrates a flow of operation among components of a trading platform according to one embodiment of the present invention.
FIG. 3 illustrates example quality scores associated with trading orders according to one embodiment of the present invention.

FIG. 2 illustrates a flow of operation among certain components of trading platform 50 according to certain embodiments of the present invention. Optimizer module 60 receives a plurality of trading orders 12 from client interface 52. Each trading order 12 received by optimizer module 60 is associated with certain objective characteristics. In particular, each trading order 12 is for a particular quantity of a particular trading product. In addition, some of the trading orders 12 may be associated with a particular price.

In addition to receiving trading orders 12, optimizer module 60 may receive market data 130. Market data 130 represents current conditions in market centers 40. These conditions may comprise current trading volumes, best bid/offer prices, trends in prices, trends in trading volumes, number of outstanding trading orders 12, number of active traders 70, time of entry of trading orders 12, and/or any other suitable number and combination of market conditions.

In addition to receiving trading orders 12 and market data 130, optimizer module 60 may receive platform data 140. Platform data 140 represents current conditions in trading platform 50. These conditions may comprise current computing capacity of trading platform 50, current storage capacity of trading platform 50, time required to process trading orders 12, electronic transmission speeds, connection speeds, amount of network traffic, number of outstanding trading orders 12, and/or any other suitable number and combination of system characteristics.

Using one or more rules 67 stored in optimizer memory 64, optimizer processor 62 is operable to process market data 130, platform data 140, and the objective characteristics associated with trading orders 12 to determine which trading orders 12 are most likely to result in timely executed transactions. Optimizer processor 62 is thereby operable to determine which trading orders 12 are most likely to increase liquidity in the marketplace and which trading orders 12 are most likely to result in efficient use of system resources. Based on these determinations, optimizer module 60 may prioritize, sequence, and/or filter trading orders 12. In particular, optimizer module 60 may assign priority to a trading order 12 that is likely to result in a timely executed trade. If optimizer module 60 determines that a particular trading order 12 is unlikely to result in a timely executed trade, optimizer module 60 may filter or not submit that trading order 12 to matching module 80 and/or market centers 40. Alternatively, optimizer module 60 may submit that trading order 12 to matching module 80 and/or market centers 40 after submitting those trading orders 12 that are more likely to result in timely executed trades.

According to certain embodiments, optimizer module 60 may prioritize and/or filter trading orders 12 by assigning quality scores 150 to trading orders 12. Using one or more rules 67 stored in optimizer memory 64, optimizer module 60 may calculate a quality score 150 for each trading order 12 based at least in part on market data 130, platform data 140, and/or the objective characteristics associated with trading orders 12. According to certain embodiments, the quality score 150 of a particular trading order 12 may represent the likelihood that the particular trading order 12 will result in a timely executed trade. For example, a particular rule 67 in optimizer memory 64 may direct optimizer module 60 to assign quality scores 150 on a ten point scale based on price and size. In this example, optimizer module 60 may allocate six points to a particular bid if the bid price is equal to the best bid price in market data 130, five points if the bid price is one incremental unit less than the best bid price, four points if the bid price is two incremental units less than the best bid price, and so forth. In this example, the particular rule 67 may also direct optimizer module 60 to allocate to the particular bid an additional four points if the bid is for more than 100 million units, three points if the bid is for between 100 million units and 50 million units, two points if the bid is for between 50 million and 25 million units, and one point is the bid is for between 25 million and 10 million units. Thus, in this example, a bid equal to the best bid price and for more than 100 million units will receive a quality score 150 of ten, but a bid that is two increments less than the best bid price and for 30 million units will receive a quality score 150 of six. As illustrated in this example, by using one or more rules 67 stored in optimizer memory 64, optimizer module 60 may assign a quality score 150 to a trading order 12 based at least in part on the objective characteristics of the trading order 12, on market data 130, on platform data 140, and/or on the objective characteristics of other trading orders 12.

In the foregoing example, quality score 150 was determined according to a ten point scale based on price and size of trading order 12. It will be understood, however, that quality score 150 may be determined according to any suitable scale based on any suitable number and combination of characteristics associated with market centers 40, trading platform 50, trading orders 12, and/or any other component of trading system 10.

Because trading platform 50 may continuously receive trading orders 12 from traders 70, optimizer module 60 may group trading orders 12 into batches based on a time interval. Optimizer module 60 may then prioritize the trading orders 12 in a particular batch relative to each other. For example, trading platform 50 may receive eight trading orders 12 between 12:31:28 p.m. and 12:31:29 p.m. and thirteen trading orders 12 between 12:31:29 p.m. and 12:31:30 p.m. In this example, if each batch is based on a one second interval, then optimizer module 60 may group the eight trading orders 12 into one batch and the thirteen trading orders 12 into another batch. In this example, optimizer module 60 may prioritize, sequence, and/or filter the eight trading orders 12 of the first batch relative to each other according to market data 130 and platform data 140 that is current as of 12:31:29 p.m. Similarly, optimizer module 60 may prioritize, sequence, and/or filter the thirteen trading orders 12 of the second batch relative to each other according to market data 130 and platform data 140 that is current as of 12:31:30 p.m. Although this example illustrates a batch interval of one second, it should be understood that the batch interval may be any suitable fixed or variable period of time such as, for example, a microsecond or a millisecond.

Using one or more rules 67 in optimizer memory 64, optimizer module 60 may determine a quality threshold 160 based at least in part on the objective characteristics of trading orders 12, market data 130, and/or platform data 140. According to certain embodiments, the quality threshold 160 is a quality level used for determining which trading orders 12 should be submitted to matching module 80 and/or market centers 40 for execution. In some embodiments, optimizer module 60 may submit to matching module 80 and/or market centers 40 those trading orders 12 with quality scores 150 that are above the quality threshold 160. Trading orders 12 with quality scores 150 that are above the quality threshold 160 may be referred to as high quality trading orders $12_H$. The trading orders 12 with quality scores 150 that are lower than the quality threshold 160 may be referred to as low quality trading orders $12_L$. Low quality trading orders $12_L$ may be stored in a queue 68 in optimizer memory 64, may be deleted, or may be returned to the corresponding trader 70. According to certain embodiments, optimizer module 60 may periodically recalculate the quality threshold 160 based at least in part on current market data 130, platform data 140, and/or the characteristics of trading orders 12. For example, in some embodiments, the period for recalculating the quality threshold 160 may correspond to the batch interval.

Referring to FIG. 3, an example illustrates certain embodiments of the present invention. Trading platform 50 receives trading order 12a at 12:31:28 p.m. One second later, trading platform 50 receives trading order 12b. Trading order 12a is a bid for 11 million units of product X with a bid price of $11.00 per unit. Trading order 12b is a bid for 125 million units of product X with a bid price of $12.00 per unit. In the present example, optimizer module 60 groups trading orders 12a and 12b into the same batch. According to current market data 130, the best bid price for product X is $13.00 per unit. Optimizer memory 64 comprises a particular rule 67 to assign a quality score 150 to each trading order 12. In this example, the particular rule 67 dictates that optimizer module 60 allocate six points to trading order 12 if the bid price is equal to the best bid price in market data 130, five points if the bid price of trading order 12 is one incremental unit less than the best bid price, four points if the bid price of trading order 12 is two incremental units less than the best bid price, and so forth. The particular rule 67 in optimizer memory 64 also dictates that optimizer module 60 allocate four points if the bid is for more than 100 million units, three points if the bid is for between 100 million units and 50 million units, two points if the bid is for between 50 million and 25 million units, and one point is the bid is for between 25 million and 10 million units.

In the present example, based on the particular rule 67, optimizer module 60 assigns to trading order 12a a quality score 150 of five points (four points because $11.00 is two incremental units less than the best bid price of $13.00 plus one point because the bid is for between 25 million and 10 million units). Optimizer module 60 assigns to trading order 12b a quality score 150 of nine points (five points because $12.00 is one incremental unit less than the best bid price of $13.00 plus four points because the bid is for more than 100 million units). In the present example, optimizer memory 64 comprises a second rule 67 for calculating a quality threshold 160 based on the objective characteristics of trading orders 12, current market data 130, and current platform data 140. Based on the second rule 67 and the relevant data, optimizer module 60 calculates a quality threshold 160 of six points. In the present example, because trading order 12a has a quality score 150 of five points, optimizer module 60 places trading order 12a in queue 68 in optimizer memory 64. Because trading order 12b has a quality score 150 of nine points, optimizer module 60 submits trading order 12b to matching module 80 for execution. Thus, in the present example, even though trading order 12b was received after trading order 12a, optimizer module 60 first submits trading order 12b to matching module 80 because trading order 12b is deemed to be of higher quality based at least in part on current market conditions. Although the particular rule 67 illustrated in this example was based on the price and size of a trading order 12, it should be understood that there may be any number of rules 67 in optimizer memory 64 and each rule 67 may be based on any number and combination of market and/or system factors and may use any appropriate unit or point system for quantifying and/or calculating quality scores 150.

The foregoing example illustrates how the present invention may, according to certain embodiments, increase liquidity in a market. By submitting higher quality trading orders 12 ahead of or instead of lower quality trading orders 12, optimizer module 60 increases the likelihood that more trading orders 12 submitted to matching module 80 and/or market centers 40 will result in timely executed trades. By increasing trades, optimizer module 60 may increase liquidity in the marketplace.

According to certain embodiments, a trading order 12 associated with a quality score 150 that is below the quality threshold 160 may be stored in queue 68 in optimizer memory 64. In some embodiments, optimizer module 60 may periodically recalculate the quality score 150 of a trading order 12 in queue 68. Alternatively, or in addition, optimizer module 60 may periodically recalculate the quality threshold 160. If the recalculated quality score 150 of a trading order 12 in queue 68 is above the original and/or recalculated quality threshold 160, optimizer module 60 may submit the trading order 12 from queue 68 in optimizer memory 64 to matching module 80 and/or market centers 40 for execution.

According to certain embodiments, matching module 80 receives trading orders 12 from optimizer module 60. Matching module 80 may process trading orders 12 based on the sequence in which those trading orders 12 are received from optimizer module 60. For example, matching module 80 may first process the trading order 12 that is first received from optimizer module 60, then process the trading order 12 that is next received from optimizer module 60, and so forth. According to other embodiments, matching module 80 may process trading orders 12 from optimizer module 60 based on the sequence in which those trading orders 12 were submitted to trading system 10 by traders 70.

In the foregoing example, optimizer module 60 used quality threshold 160 to determine which trading orders 12 to submit to matching module 80 and/or market centers 40. According to certain embodiments, optimizer module 60 may not use quality threshold 160. In some embodiments, optimizer module 60 may first prioritize trading orders 12 according to their respective quality scores 150 and then submit to matching module 80 and/or market centers 40 all trading orders 12 in order of decreasing quality scores 150.

Figure 4:
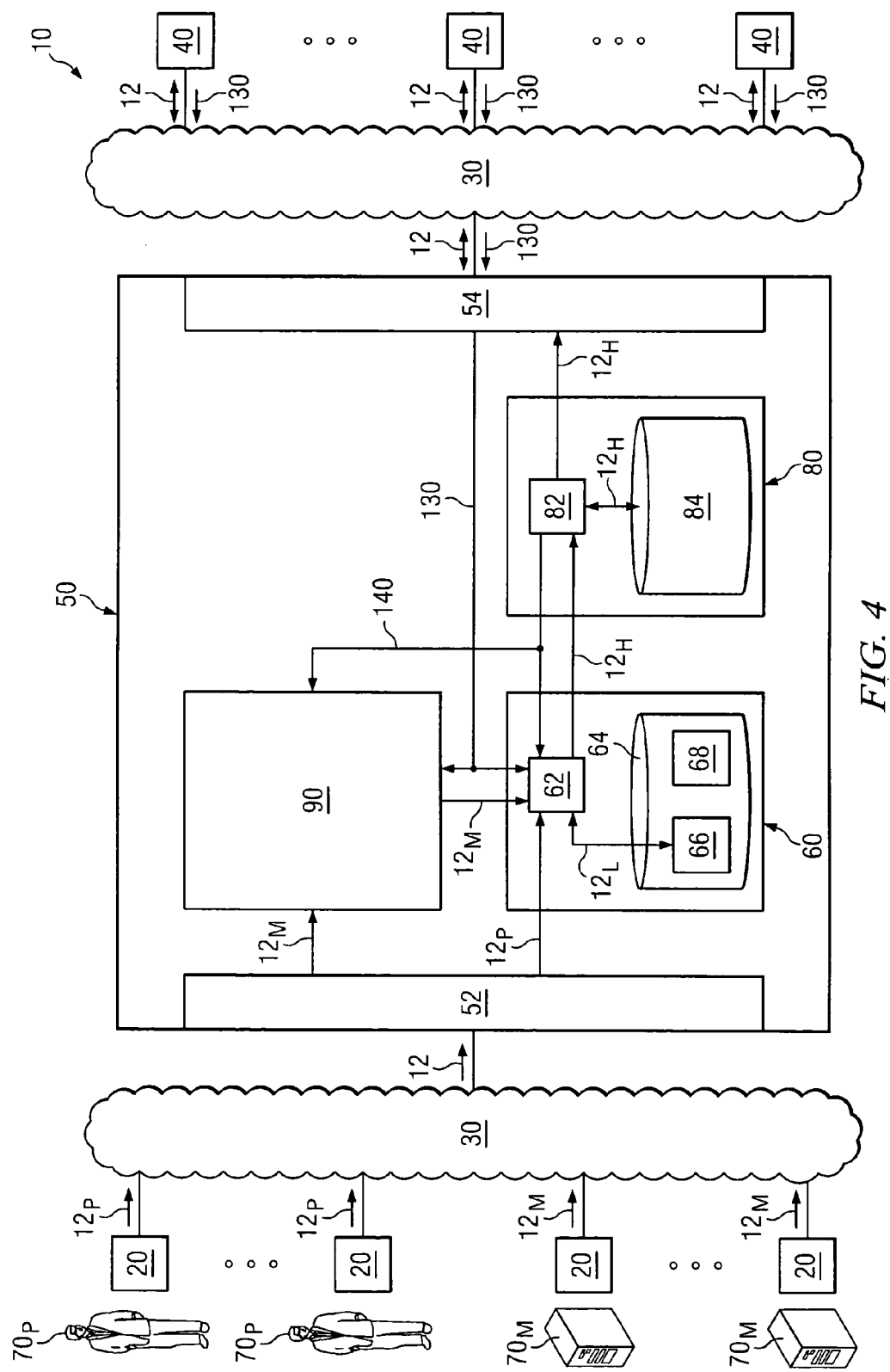
FIG. 4 illustrates a trading system comprising a balancing module according to one embodiment of the present invention.

Referring to FIG. 4, traders 70 may comprise humans and machines. Trading orders 12 submitted by machine traders $70_M$ may be referred to as machine trading orders $12_M$. Trading orders 12 submitted by human traders $70_P$ may be referred to as human trading orders $12_P$. Machine traders $70_M$ may refer to a robot, an automated computer system, a machine, and/or any other device configured for automatically submitting trading orders 12 to trading system 10 in response to configurable criteria, factors, and/or thresholds. According to certain embodiments, trading platform 50 may increase liquidity in the marketplace by differentiating between trading orders 12 submitted by human traders $70_P$ and trading orders 12 submitted by machine traders $70_M$. To achieve such differentiation, trading platform 50 may comprise a balancing module 90. FIG. 4 illustrates a flow of operation involving balancing module 90, according to certain embodiments of the present invention.

Client interface 52 may be operable to determine which trading orders 12 were submitted by human traders $70_P$ and which trading orders 12 were placed by machine traders $70_M$. Client interface 52 may transmit the trading orders $12_P$ submitted by human traders $70_P$ directly to optimizer processor 62. Client interface 52 may transmit the trading orders $12_M$ submitted by machine traders $70_M$ to balancing module 90.

Balancing module 90 represents any hardware, software, firmware, or combination thereof operable to process, control, and monitor the prioritizing, filtering, and/or sequencing of trading orders $12_M$ submitted by machine traders $70_M$. Balancing module 90 may comprise a general-purpose personal computer (PC), a workstation, a Unix-based computer, a server computer, or any other suitable processing device. Balancing module 90 may be communicatively coupled to client interface 52, market interface 54, and/or optimizer module 60. Balancing module 90 may comprise a processor and memory usable to prioritize, sequence, and/or filter trading orders $12_M$ submitted by machine traders $70_M$. In addition, balancing module 90 may comprise algorithms, functions, tables, or formulas for optimizing the submission of trading orders $12_M$ from machine traders $70_M$ to optimizing module 60. Generally, balancing module 90 receives trading orders $12_M$ from machine traders $70_M$ and prioritizes, filters, and/or sequences trading orders $12_M$ based at least in part on market data 130 received from market centers 40, on platform data 140, and/or on the characteristics of trading orders 12. According to certain embodiments, optimizer module 60 may determine a particular number of trading orders $12_M$ to request from balancing module 90 based on market data 130, platform data 140, and/or the characteristics of trading orders 12.

An example illustrates certain embodiments of the present invention. Client interface 52 receives sixteen trading orders 12—six from human traders $70_P$ and ten from machine traders $70_M$. Client interface 52 transmits the six trading orders $12_P$ from human traders $70_P$ directly to optimizer module 60. Client interface 52 transmits the ten trading orders $12_M$ from machine traders $70_M$ to balancing module 90. In the present example, optimizer module 60 comprises a rule 67 to request from balancing module 90 one trading order $12_M$ submitted by a machine trader $70_M$ for every two trading orders $12_P$ submitted by human traders $70_P$. Since optimizer module 60 received six trading orders $12_P$ submitted by human traders $70_P$, then optimizer module 60 may request from balancing module 90 three trading orders $12_M$ submitted by machine traders $70_M$. Balancing module 90 receives the request from optimizer module 70. Using one or more optimization algorithms stored in balancing module 90, balancing module 90 determines the three preferred trading orders $12_M$ submitted by machine traders $70_M$. (The determination of which trading orders 12 are "preferred" may be based on any suitable criteria, method, settings, limits, data, formulas, and/or any suitable number and combination of factors.) Balancing module 90 then transmits the three preferred trading orders $12_M$ submitted by machine traders $70_M$ to optimizer module 60. Upon receiving the requested trading orders $12_M$ from balancing module 90, optimizer module 60 prioritizes, sequences, and/or filters the nine trading orders 12 (six from human traders $70_P$ and three from machine traders $70_M$) based at least in part on market data 130 received from market centers 40, on platform data 140, and/or on the characteristics of trading orders 12. Optimizer module 60 then submits one or more trading orders 12 to matching module 80. Although in the foregoing example the requested number of trading orders $12_M$ from machine traders $70_M$ was based on the number of trading orders $12_P$ from human traders $70_P$, it should be understood that optimizer module 60 may use any suitable factors, formulas, or algorithms for determining the number of trading orders $12_M$ to request from balancing module 90. In addition, or alternatively, optimizer module 60 may modify quality score 150 associated with trading order 12 based at least in part on whether that trading order 12 was submitted by a human trader $70_P$ or a machine trader $70_M$.

Figure 5:
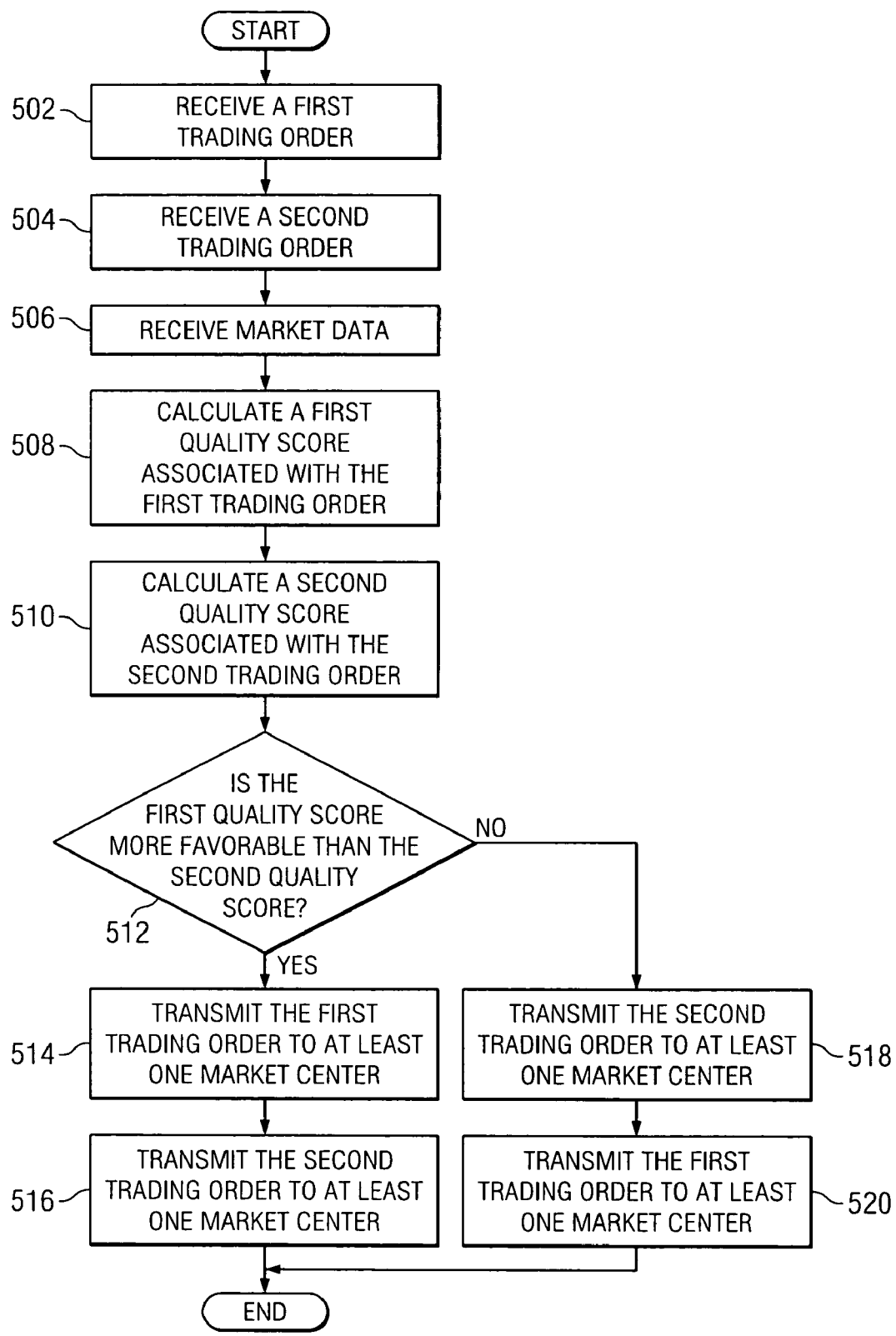
FIG. 5 illustrates a flowchart for processing trading orders according to one embodiment of the present invention.

FIG. 5 illustrates a flowchart for processing trading orders 12 according to certain embodiments of the present invention. The method begins at step 502 where trading platform 50 receives a first trading order 12. The first trading order 12 may be associated with a particular price and a particular trading product. At step 504, trading platform 50 receives a second trading order 12. In some embodiments, the second trading order 12 may be associated with a particular price and may be for the same trading product as the first trading order 12. At step 506, trading platform 50 receives market data 130 from at least one market center 40.

At step 508, trading platform 50 calculates a first quality score 150 associated with the first trading order 12. At step 510, trading platform 50 calculates a second quality score 150 associated with the second trading order 12. The first and second quality scores 150 may be based at least in part on the first trading order 12, the second trading order 12, market data 130, and/or platform data 140. At step 512, trading platform 50 may determine whether the first quality score 150 associated with the first trading order 12 is more favorable than the second quality score 150 associated with the second trading order 12. A more favorable quality score 150 may indicate that the associated trading order 12 would be executed faster than another trading order 12 associated with a less favorable quality score 150. If at step 512, trading platform 50 determines that the first quality score 150 associated with the first trading order 12 is more favorable than the second quality score 150 associated with the second trading order 12, then at step 514 trading platform 50 may transmit the first trading order 12 to at least one market center 40 for execution. Then at step 516, trading platform 50 may transmit the second trading order 12 to at least one market center 40 for execution. However, if at step 512, trading platform 50 determines that the first quality score 150 associated with the first trading order 12 is less favorable than the second quality score 150 associated with the second trading order 12, then at step 518 trading platform 50 may transmit the second trading order 12 to at least one market center 40 for execution. Then at step 520, trading platform 50 may transmit the first trading order 12 to at least one market center 40 for execution.

In the foregoing example, trading platform 50 compares the first and second quality scores 150 against one another. In some embodiments, trading platform 50 may compare quality scores 150 associated with trading orders 12 against a quality threshold 160. Trading platform 50 may generate quality threshold 160 based at least in part on market data 130, platform data 140, and/or trading orders 12. If a particular trading order 12 is associated with a particular quality score 150 that satisfies quality threshold 160, then trading platform 50 may transmit that trading order 12 to one or more market centers 40 for execution. However, if a particular trading order 12 is associated with a particular quality score 150 that does not satisfy quality threshold 160, then trading platform 50 may reject that trading order 12, delete that trading order 12, return that trading order 12 to the corresponding trader 70, and/or store that trading order 12 in queue 68 in optimizer memory 64. If trading platform 50 stores that trading order 12 in queue 68, then after a configurable time interval, trading platform 50 may, based at least in part on updated market data 130, calculate an update quality score 150 for that trading order 12. Trading platform 50 may then compare quality threshold 160 against the updated quality score 150 associated with trading order 12 in queue 68. If the updated quality score 150 associated with trading order 12 in queue 68 satisfies quality threshold 160, then trading platform 50 may transmit that trading order 12 to one or more market centers 40 for execution.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for processing trading orders, comprising:
    receiving by at least one processor a first trading order from a trading participant, the first trading order comprising one of a bid to purchase a volume of financial instruments and an offer to sell a volume of financial instruments;
    after receiving the first trading order, receiving by the at least one processor a second trading order from a trading participant;
    receiving by the at least one processor market data associated with at least one market center, the market data comprising at least one of (1) one or more trading volumes, (2) one or more best bid or offer prices, (3) one or more trends in prices, (3) one or more trends in trading volumes, (4) one or more times of entry of one or more trading orders, (5) a number of outstanding trading orders, and (5) a number of active traders;
    determining by the at least one processor whether to transmit the second trading order to the at least one market center prior to transmitting the first trading order to the at least one market center, the determination based at least in part on the market data, in which the act of determining comprises determining to transmit the second trading order to the at least one market center prior to transmitting the first trading order to the at least one market center;
    based at least in part on the act of determining to transmit the second order to the at least one market center prior to transmitting the first trading order to the at least one market center, transmitting the second order to the at least one market center before any transmitting of the first trading order to any market center.

2. The method of claim 1, wherein the determination comprises:
    calculating by the at least one processor a first quality score associated with the first trading order, the first quality score based at least in part on the market data and on the first trading order, in which the first quality score represents a likelihood that the first trading order will result in a timely executed trade;
    calculating by the at least one processor a second quality score associated with the second trading order, the second quality score based at least in part on the market data and on the second trading order, in which the second quality score represents a likelihood that the second trading order will result in a timely executed trade;
    comparing by the at least one processor the first quality score associated with the first trading order against the second quality score associated with the second trading order;
    determining that the second quality score associated with the second trading order represents a higher likelihood of resulting in a timely executed trade than the first trading order associated with the first trading order; and prioritizing a transmission of the first trading order and the second trading order relative to one another based at least in part on the first quality score and the second quality score.

3. The method of claim 2, wherein:
the first trading order is associated with a first price;
the market data comprises a second price; and
the first quality score is based at least in part on the first price and the second price.

4. The method of claim 2, wherein:
the first trading order is associated with a quantity of a trading product; and
the first quality score is based at least in part on the quantity of the trading product.

5. The method of claim 2, wherein the first quality score is based at least in part on a determination that the first trading order is associated with a machine trader.

6. The method of claim 2, further comprising:
transmitting by the at least one processor at least one trading order to a queue, in which the at least one trading order comprises the first trading order;
receiving updated market data after a configurable interval of time;
calculating by the at least one processor an updated quality score associated with the at least one trading order in the queue, the updated quality score based at least in part on the updated market data and the at least one trading order; and
determining by the at least one processor whether to transmit the at least one trading order to the at least one market center, the determination based at least in part on the updated quality score.

7. The method of claim 1, wherein the determination comprises:
calculating by the at least one processor a first quality score associated with the first trading order, the first quality score based at least in part on the market data and on the first trading order;
calculating by the at least one processor a second quality score associated with the second trading order, the second quality score based at least in part on the market data and on the second trading order;
determining by the at least one processor a quality threshold based at least in part on the market data; and
comparing by the at least one processor the first quality score associated with the first trading order and the second quality score associated with the second trading order against the quality threshold.

8. The method of claim 7, wherein:
the first trading order is associated with a first price;
the market data comprises a second price; and
the first quality score is based at least in part on the first price and the second price.

9. The method of claim 7, wherein:
the first trading order is associated with a quantity of a trading product; and
the first quality score is based at least in part on the quantity of the trading product.

10. The method of claim 7, wherein the first quality score is based at least in part on whether the first trading order is associated with a machine trader.

11. The method of claim 7, further comprising rejecting or deleting by the at least one processor a particular trading order if the particular trading order is associated with a quality score that does not satisfy the quality threshold, in which the particular trading order comprises one of the first trading order and the second trading order.

12. The method of claim 7, further comprising transmitting by the at least one processor a particular trading order to a queue if the particular trading order is associated with a quality score that does not satisfy the quality threshold, in which the particular trading order comprises one of the first trading order and the second trading order.

13. The method of claim 12, further comprising:
receiving by the at least one processor updated market data after a configurable interval of time;
calculating by the at least one processor an updated quality score associated with at least one trading order in the queue, the updated quality score based at least in part on the updated market data and the at least one trading order;
comparing by the at least one processor the updated quality score associated with the at least one trading order against the quality threshold; and
if the updated quality score associated with the at least one trading order satisfies the quality threshold, transmitting by the at least one processor the at least one trading order to the at least one market center.

14. The method of claim 1, wherein the determination is based at least in part on platform data representing computing capacity and/or storage capacity associated with a computer trading system.

15. A system for processing trading orders, comprising:
an optimizer module comprising a processor; and
a memory that stores instructions which, when executed by the optimizer module, direct the optimizer module to:
receive a first trading order from a trading participant, the first trading order comprising one of a bid to purchase a volume of financial instruments and an offer to sell a volume of financial instruments;
after receiving the first trading order, receive a second trading order from a trading participant, the second trading order comprising one of a bid to purchase a volume of financial instruments and an offer to sell a volume of financial instruments;
receive market data associated with at least one market center, the market data comprising at least one of (1) one or more trading volumes, (2) one or more best bid or offer prices, (3) one or more trends in prices, (3) one or more trends in trading volumes, (4) one or more times of entry of one or more trading orders, (5) a number of outstanding trading orders, and (5) a number of active traders;
determine whether to transmit the second trading order to the at least one market center prior to transmitting the first trading order to the at least one market center, the determination based at least in part on the market data, in which the act of determining comprises determining to transmit the second trading order to the at least one market center prior to transmitting the first trading order to the at least one market center; and
based at least in part on the act of determining to transmit the second order to the at least one market center prior to transmitting the first trading order to the at least one market center, transmitting the second order to the at least one market center before any transmitting of the first trading order to any market center.

16. The system of claim 15, wherein the instructions, when executed by the optimizer module, direct the optimizer module to make the determination by:
calculating a first quality score associated with the first trading order, the first quality score based at least in part on the market data and on the first trading order, in which the first quality score represents a likelihood that the first trading order will result in a timely executed trade;

calculating a second quality score associated with the second trading order, the second quality score based at least in part on the market data and on the second trading order, in which the second quality score represents a likelihood that the second trading order will result in a timely executed trade;

comparing the first quality score associated with the first trading order against the second quality score associated with the second trading order;

determining that the second quality score associated with the second trading order represents a higher likelihood of resulting in a timely executed trade than the first trading order associated with the first trading order; and prioritizing a transmission of the first trading order and the second trading order relative to one another based at least in part on the first quality score and the second quality score.

17. The system of claim 16, wherein:
the first trading order is associated with a first price;
the market data comprises a second price; and
the first quality score is based at least in part on the first price and the second price.

18. The system of claim 16, wherein:
the first trading order is associated with a quantity of a trading product; and
the first quality score is based at least in part on the quantity of the trading product.

19. The system of claim 16, wherein the first quality score is based at least in part on whether the first trading order is associated with a machine trader.

20. The system of claim 16, wherein the instructions, when executed by the optimizer module, direct the optimizer module to:
transmit at least one trading order to a queue, in which the at least one trading order comprises the first trading order;
receive updated market data after a configurable interval of time;
calculate an updated quality score associated with the at least one trading order in the queue, the updated quality score based at least in part on the updated market data and the at least one trading order; and
determine whether to transmit the at least one trading order to the at least one market center, the determination based at least in part on the updated quality score.

21. The system of claim 16, wherein the first quality score is based at least in part on a determination that the first trading order is associated with a machine trader, and wherein the second quality score is based at least in part on a determination that the second trading order is associated with a human trader.

22. The system of claim 15, wherein the instructions, when executed by the optimizer module, direct the optimizer module to make the determination by:
calculating a first quality score associated with the first trading order, the first quality score based at least in part on the market data and on the first trading order;
calculating a second quality score associated with the second trading order, the second quality score based at least in part on the market data and on the second trading order;
determining a quality threshold based at least in part on the market data; and
comparing the first quality score associated with the first trading order and the second quality score associated with the second trading order against the quality threshold.

23. The system of claim 22, wherein:
the first trading order is associated with a first price;
the market data comprises a second price; and
the first quality score is based at least in part on the first price and the second price.

24. The system of claim 22, wherein:
the first trading order is associated with a quantity of a trading product; and
the first quality score is based at least in part on the quantity of the trading product.

25. The system of claim 22, wherein the first quality score is based at least in part on whether the first trading order is associated with a machine trader.

26. The system of claim 22, wherein the instructions, when executed by the optimizer module, further direct the optimizer module to reject or delete a particular trading order if the particular trading order is associated with a quality score that does not satisfy the quality threshold, in which the particular trading order comprises one of the first trading order and the second trading order.

27. The system of claim 22, wherein the instructions, when executed by the optimizer module, further direct the optimizer module to transmit a particular trading order to a queue if the particular trading order is associated with a quality score that does not satisfy the quality threshold, in which the particular trading order comprises one of the first trading order and the second trading order.

28. The system of claim 27, wherein the instructions, when executed by the optimizer module, further direct the optimizer module to:
receive updated market data after a configurable interval of time;
calculate an updated quality score associated with at least one trading order in the queue, the updated quality score based at least in part on the updated market data and the at least one trading order;
compare the updated quality score associated with the at least one trading order against the quality threshold; and
if the updated quality score associated with the at least one trading order satisfies the quality threshold, transmit the at least one trading order to the at least one market center.

29. The system of claim 22, wherein the optimizer module is further operable to return a particular trading order to a trader who submitted the particular trading order if the particular trading order is associated with a quality score that does not satisfy the quality threshold, in which the particular trading order comprises one of the first trading order and the second trading order.

30. The system of claim 15, wherein the determination is based at least in part on platform data representing computing capacity and/or storage capacity associated with a computer trading system.

31. The system of claim 15, in which the first trading order is received by a trading platform from a first trading entity, and the second trading order is received by the trading platform from a second trading entity that is different from the first trading entity, in which the trading platform comprises at least one processor that (1) receives a plurality of trading orders from a plurality of trading participants and (2) facilitates the routing and matching of the plurality of trading orders.

32. A computer-readable medium that stores instructions which, when executed by at least one processor, directs the at least one processor to:

receive a first trading order from a trading participant, the first trading order comprising one of a bid to purchase a volume of financial instruments and an offer to sell a volume of financial instruments;

after receiving the first trading order, receive a second trading order from a trading participant, the second trading order comprising one of a bid to purchase a volume of financial instruments and an offer to sell a volume of financial instruments;

receive market data associated with at least one market center, the market data comprising at least one of (1) one or more trading volumes, (2) one or more best bid or offer prices, (3) one or more trends in prices, (3) one or more trends in trading volumes, (4) one or more times of entry of one or more trading orders, (5) a number of outstanding trading orders, and (5) a number of active traders; and determine whether to transmit the second trading order to the at least one market center prior to transmitting the first trading order to the at least one market center, the determination based at least in part on the market data, in which the act of determining comprises determining to transmit the second trading order to the at least one market center prior to transmitting the first trading order to the at least one market center;

based at least in part on the act of determining to transmit the second order to the at least one market center prior to transmitting the first trading order to the at least one market center, transmitting the second order to the at least one market center before any transmitting of the first trading order to any market center.

33. The computer-readable medium of claim 32, wherein the instructions, when executed by the at least one processor, further direct the at least one processor to make the determination by:

calculating a first quality score associated with the first trading order, the first quality score based at least in part on the market data and on the first trading order, in which the first quality score represents a likelihood that the first trading order will result in a timely executed trade;

calculating a second quality score associated with the second trading order, the second quality score based at least in part on the market data and on the second trading order, in which the second quality score represents a likelihood that the second trading order will result in a timely executed trade;

comparing the first quality score associated with the first trading order against the second quality score associated with the second trading order;

determining that the second quality score associated with the second trading order represents a higher likelihood of resulting in a timely executed trade than the first trading order associated with the first trading order; and prioritizing a transmission of the first trading order and the second trading order relative to one another based at least in part on the first quality score and the second quality score.

34. The computer-readable medium of claim 33, wherein:
the first trading order is associated with a first price;
the market data comprises a second price; and
the first quality score is based at least in part on the first price and the second price.

35. The computer-readable medium of claim 33, wherein:
the first trading order is associated with a quantity of a trading product; and
the first quality score is based at least in part on the quantity of the trading product.

36. The computer-readable medium of claim 33, wherein the first quality score is based at least in part on whether the first trading order is associated with a machine trader.

37. The computer-readable medium of claim 33, wherein the instructions, when executed by the at least one processor, further direct the at least one processor to:

transmit at least one trading order to a queue, in which the at least one trading order comprises the first trading order;

receive updated market data after a configurable interval of time;

calculate an updated quality score associated with the at least one trading order in the queue, the updated quality score based at least in part on the updated market data and the at least one trading order; and determine whether to transmit the at least one trading order to the at least one market center, the determination based at least in part on the updated quality score.

38. The computer-readable medium of claim 32, instructions, when executed by the at least one processor, further direct the at least one processor to make the determination by:

calculating a first quality score associated with the first trading order, the first quality score based at least in part on the market data and on the first trading order;

calculating a second quality score associated with the second trading order, the second quality score based at least in part on the market data and on the second trading order;

determining a quality threshold based at least in part on the market data; and comparing the first quality score associated with the first trading order and the second quality score associated with the second trading order against the quality threshold.

39. The computer-readable medium of claim 38, wherein:
the first trading order is associated with a first price;
the market data comprises a second price; and
the first quality score is based at least in part on the first price and the second price.

40. The computer-readable medium of claim 38, wherein:
the first trading order is associated with a quantity of a trading product; and
the first quality score is based at least in part on the quantity of the trading product.

41. The computer-readable medium of claim 38, wherein the first quality score is based at least in part on whether the first trading order is associated with a machine trader.

42. The computer-readable medium of claim 38, wherein the instructions, when executed by the at least one processor, further direct the at least one processor to reject or delete a particular trading order if the particular trading order is associated with a quality score that does not satisfy the quality threshold, in which the particular trading order comprises one of the first trading order and the second trading order.

43. The computer-readable medium of claim 38, wherein the instructions, when executed by the at least one processor, further direct the at least one processor to transmit a particular trading order to a queue if the particular trading order is associated with a quality score that does not satisfy the quality threshold, in which the particular trading order comprises one of the first trading order and the second trading order.

44. The computer-readable medium of claim 43, wherein the instructions, when executed by the at least one processor, further direct the at least one processor to:
- receive updated market data after a configurable interval of time;
- calculate an updated quality score associated with at least one trading order in the queue, the updated quality score based at least in part on the updated market data and the at least one trading order;
- compare the updated quality score associated with the at least one trading order against the quality threshold; and
- if the updated quality score associated with the at least one trading order satisfies the quality threshold, transmit the at least one trading order to the at least one market center.

45. The computer-readable medium of claim 32, wherein the determination is based at least in part on platform data representing computing capacity and/or storage capacity associated with a computer trading system.

* * * * *